UNITED STATES PATENT OFFICE.

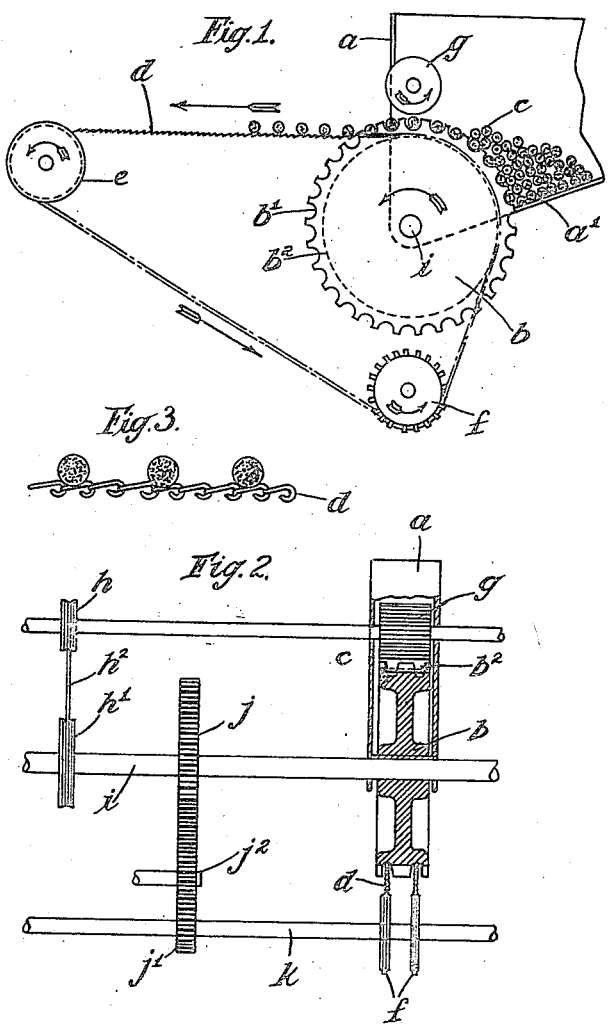

WALTER EVERETT MOLINS, OF LONDON, ENGLAND.

APPARATUS FOR COLLECTING AND CONVEYING CIGARETTES OR THE LIKE.

1,422,600.          Specification of Letters Patent.      Patented July 11, 1922.

Application filed July 7, 1920. Serial No. 394,585.

*To all whom it may concern:*

Be it known that I, WALTER EVERETT MOLINS, a citizen of the United States, residing in London, England, have invented certain new and useful Apparatus for Collecting and Conveying Cigarettes or the like (for which I have filed an application for patent in England March 28, 1919, Patent No. 139,047), of which the following is a specification.

This invention relates to improved means for collecting and conveying in accurately spaced formation cigarettes, matches or other similar articles, which are delivered from a hopper by means of a transversely fluted rotating cylinder or drum in the known manner.

According to the invention endless moving conveying chains are provided, one on each side of the rotating fluted cylinder, said chains being so positioned that they lift the cigarettes or other articles out of the flutes in the cylinder in succession as it revolves and carry said cigarettes or articles along, spaced at accurate intervals depending on the pitch of the flutes on the cylinder.

To enable the invention to be fully understood it will now be described by reference to the accompanying drawings in which:—

Fig. 1 is a side elevation of one form of apparatus constructed according to the invention with a portion of the hopper removed, the apparatus being illustrated as operating on cigarettes.

Fig. 2 is a front elevation partly in section.

Fig. 3 is a view drawn to a larger scale showing the cigarettes resting on the links of a conveying chain.

As shown, the apparatus comprises a hopper $a$ having an inclined bottom $a'$, and a revolving cylinder $b$ with transverse peripheral flutes $b'$ arranged at regular intervals. The cylinder $b$ is mounted in a suitable opening in the bottom of the hopper, and when rotated collects the cigarettes in the known manner. The cylinder $b$ is also provided with two circumferential grooves $b^2$ such grooves being deeper than the flutes $b'$ and serving to receive endless conveying chains $d$. The chains $d$ are positively driven by sprocket wheels $f$ and pass over a trolley or tension roller $e$, the arrangement being such that the chains leave the cylinder $b$ at a tangent and in an approximately horizontal position, thus removing the cigarettes as the cylinder revolves.

The chains $d$ are driven at a speed somewhat greater than the peripheral speed of the grooves $b^2$ and slip over the surface of said grooves. This ensures that the cigarettes are not displaced by the outer edges of the flutes as they are removed from said flutes, since the said outer edges are naturally rotating at a greater peripheral speed than the grooves $b^2$.

A roller $g$ rotating above the cylinder and in the opposite direction to the rotation of the latter, prevents more than one cigarette at a time being carried out of the hopper by each flute, in the known manner.

This roller $g$ may be driven by grooved pulleys $h$, $h'$, and belt $h^2$ from the spindle $i$ of the cylinder $b$. The spindle $i$ also carries a spur wheel $j$ which transmits motion to the spindle $k$ through an intermediate spur wheel $j^2$ and a spur wheel $j'$, the chain sprocket wheels $f$ being mounted on said spindle $k$.

With apparatus constructed as above described it will be seen that the chains $d$ may be so driven that the recesses formed by the links of the chain are timed relative to the flutes of the revolving cylinder so that each cigarette rests in a recess and leaves the fluted cylinder in a mechanically positive location. For this purpose the pitch of the chains $d$ bears a definite relation to the pitch of the flutes $b'$ of the cylinder $b$.

The invention ensures moreover that any articles collected by the fluted cylinder are removed and conveyed therefrom in positively equi-distant formation regardless of considerable variations in the diameter or shape of the articles, and such articles may therefore be the more readily counted, or collected into groups of a desired number by any suitable mechanical cut off mechanism coming into regular periodic contact with the continuously moving chains.

Without departing from the principle of the invention, obviously a cylinder somewhat narrower than the length of the cigarettes may be used so that the ends of the latter protrude from the flutes at each side of the cylinder. The chains may then be disposed at the sides of the cylinder upon suitable rollers or sprockets in any convenient manner. Obviously two or more sets of cylinders, chains and hoppers disposed side by side, opposite, or in any desired manner to deliver the articles in rows or otherwise as required, may be used if desired.

Having thus described the nature of the said invention and the best means I know for carrying the same into practical effect I claim:—

1. In apparatus for collecting and conveying cigarettes and other articles and in combination a hopper for the articles, a transversely fluted rotary cylinder and endless moving conveyors, one adjacent each end of said cylinder and adapted to be driven at a higher peripheral speed than that of the rotary fluted cylinder.

2. In apparatus for collecting and conveying cigarettes and other articles and in combination, a hopper for the articles, a rotary cylinder having transverse flutings to receive the articles in the hopper and provided with peripheral grooves, and endless moving conveyor chains running in said peripheral grooves in the cylinder at a higher peripheral speed than that of the rotary fluted cylinder.

3. In apparatus for collecting and conveying cigarettes and other articles, a hopper for the articles, a cylinder having transverse flutings to engage articles in the hopper and provided with peripheral grooves, and endless conveyer chains running in said peripheral grooves at a higher speed than the periphery of the cylinder and extending tangentially to said cylinder in a substantially horizontal direction.

4. In apparatus for collecting and conveying cigarettes and other articles and in combination, a hopper for the articles, a rotary cylinder having flutings to engage with the articles in the hopper and provided with peripheral grooves, endless moving conveyor chains mounted in the peripheral grooves in the fluted cylinder, and means for positively driving said chains at a higher peripheral speed than that of said cylinder.

5. In apparatus for collecting and conveying cigarettes and other articles and in combination, a hopper for the articles, a rotary transversely fluted cylinder in engagement with the articles in the hopper, and having grooves in its periphery, endless moving conveyor chains running in the peripheral grooves of said cylinder and extending tagentially to said cylinder in substantially horizontal direction, and means for driving said chains at a higher peripheral speed than that of said fluted cylinder.

In testimony whereof I have signed my name to this specification.

WALTER EVERETT MOLINS.